US012631936B2

(12) United States Patent
Messina

(10) Patent No.: US 12,631,936 B2
(45) Date of Patent: May 19, 2026

(54) CAVITY-BASED DIFFUSION ENHANCEMENT IN SUBSTRATES

(71) Applicant: OMRON Corporation, Kyoto (JP)

(72) Inventor: Michael C. Messina, Hooksett, NH (US)

(73) Assignee: OMRON Corporation, Kyoto (JP)

( * ) Notice: Subject to any disclaimer, the term of this patent is extended or adjusted under 35 U.S.C. 154(b) by 384 days.

(21) Appl. No.: 18/211,231

(22) Filed: Jun. 16, 2023

(65) Prior Publication Data

US 2024/0419049 A1     Dec. 19, 2024

(51) Int. Cl.
*G02F 1/29*          (2006.01)
(52) U.S. Cl.
CPC .................................... *G02F 1/292* (2013.01)
(58) Field of Classification Search
CPC ......... G02F 1/292; G02B 5/02; G02B 5/0284; G02B 5/0278; G02B 5/0257; G02B 5/0215
See application file for complete search history.

(56) References Cited

U.S. PATENT DOCUMENTS 6,449,439 B1 * 9/2002 Boyd ................... G02B 6/0096
                                                    362/558
7,561,609 B2   7/2009 Fujimoto et al.

2009/0009861 A1 * 1/2009 Hyobu ................. G03B 21/625
                                                      359/619
2011/0242845 A1 * 10/2011 Hong ................... G02B 6/0078
                                                       362/613
2017/0138546 A1 * 5/2017 Wang .................... F21V 7/0091
2018/0202921 A1 * 7/2018 Kobayashi ......... G01N 15/1434
2019/0113677 A1 * 4/2019 Kawano .............. G02B 6/0096
2020/0386991 A1 * 12/2020 Chen .................... G02B 5/0284
2021/0072553 A1 * 3/2021 Danziger ............. H04N 9/3105

FOREIGN PATENT DOCUMENTS

CN      113820887 A     12/2021
CN      217332910 U      8/2022
JP       6684704 B2       4/2020

* cited by examiner

*Primary Examiner* — Jonathan Y Jung
(74) *Attorney, Agent, or Firm* — Morgan, Lewis & Bockius LLP

(57) ABSTRACT

This application is directed to diffusing light using a light modulator. The light modulator has an integral piece of material and a cavity. The integral piece of material includes a first wall and a second wall that is separate from the first wall. The cavity is located between the first wall and the second wall. The light modulator is configured to diffuse light emitted by a light source that is (i) disposed in proximity to the light modulator and (ii) faces the first wall, by scattering the light at surfaces of the first wall, the cavity, and the second wall, and diffracting the light within at least the first wall and the second wall. In some embodiments, an edge structure extends from one or more edges of the first wall to one or more corresponding edges of the second wall.

21 Claims, 9 Drawing Sheets

Filler Material or Filler Structure

Solid Translucent Substrate with Cavity

CAVITY-BASED DIFFUSION ENHANCEMENT IN SUBSTRATES

TECHNICAL FIELD

The disclosed embodiments relate generally to electronic circuits and more specifically to systems, devices, and methods for diffusing light using a structured light modulator having one or more cavities.

BACKGROUND

LEDs are applied to provide a wide variety of illumination solutions (e.g., environmental lighting and backlighting in mobile devices). Optical data-reading systems and devices (e.g., scanning devices) also apply the LEDs to illuminate an object, thereby enabling identification and tracking of the object. LEDs are also used as indicators to provide information concerning operation of electronic devices including the LEDs. Each LED has a compact form factor and provides illumination at a focused light spot. In many applications, such focused light has to be diffused to form a uniform or homogenous bright body by passing light through a textured or opaque material. During the course of diffusing the focused light, the textured or opaque material absorbs a significant portion of illumination power emitted by the LED and compromises the illumination efficiency of the corresponding LED illumination system. It would be beneficial to have an efficient light diffusion solution that diffuses light illumination of a focused light source efficiently, thereby providing a substantially uniform and homogenous optical indicator, display, or light source.

SUMMARY

Various embodiments of this application are directed to a light modulator incorporating one or more cavities in an integral piece of material to diffuse light in a substantially uniform and homogenous manner. The integral piece of material provides external walls and optional internal walls, and the one or more cavities are formed among these walls of the integral piece of materials. Light is scattered at surfaces of the walls and cavities of the integral piece of material and diffracted within at least the walls of the integral piece of material. Each cavity creates a pocket that produces additional diffusing surfaces to enhance diffusion within the light modulator. Each cavity is machined or molded into the integral piece of material and is inherent to the light modulator, thereby eliminating the need to retain additional layers with mounting structures. The light modulator is scalable in size to satisfy various requirements. By these means, the light modulator efficiently provides a substantially uniform and homogenous light indicator in an electronic device or provides a substantially uniform and homogenous light source in machine vision and inspection applications.

In one aspect, a light modulator includes an integral piece of material and a cavity. The integral piece of material includes a first wall and a second wall that is separate from the first wall. The cavity is located between the first wall and the second wall. The light modulator is configured to diffuse light emitted by a light source (which is disposed in proximity to the light modulator and faces the first wall) by scattering the light at surfaces of the first wall, the cavity, and the second wall, and diffracting the light within at least the first wall and the second wall. In some embodiments, the integral piece of material is substantially transparent or translucent. In some embodiments, the integral piece of material includes an opaque material that enhances diffusion without a need of having textured surfaces.

In another aspect, a light module includes a light modulator and a light source. The light modulator includes an integral piece of material and a cavity. The integral piece of material includes a first wall and a second wall that is separate from the first wall, and the cavity is located between the first wall and the second wall. The light source is disposed in proximity to the light modulator and faces the first wall. The light modulator is configured to diffuse light emitted by the light source by scattering the light at surfaces of the first wall, the cavity, and the second wall and diffracting the light within at least the first wall and the second wall.

In yet another aspect, an electronic device includes a light modulator. The light modulator includes an integral piece of material and a cavity. The integral piece of material includes a first wall and a second wall that is separate from the first wall. The cavity is located between the first wall and the second wall. The light modulator is configured to diffuse light emitted by a light source (which is disposed in proximity to the light modulator and faces the first wall) by scattering the light at surfaces of the first wall, the cavity, and the second wall, and diffracting the light within at least the first wall and the second wall.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the entire inventive subject matter.

These illustrative embodiments and implementations are mentioned not to limit or define the disclosure, but to provide examples to aid understanding thereof. Additional embodiments are discussed in the Description of Embodiments, and further description is provided there.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF EMBODIMENTS

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of the claims and the subject matter may be practiced without these specific details. For example, it will be apparent to one of ordinary skill in the art that the subject matter presented herein can be implemented on many types of electronic devices.

Figures 1A, 1B:
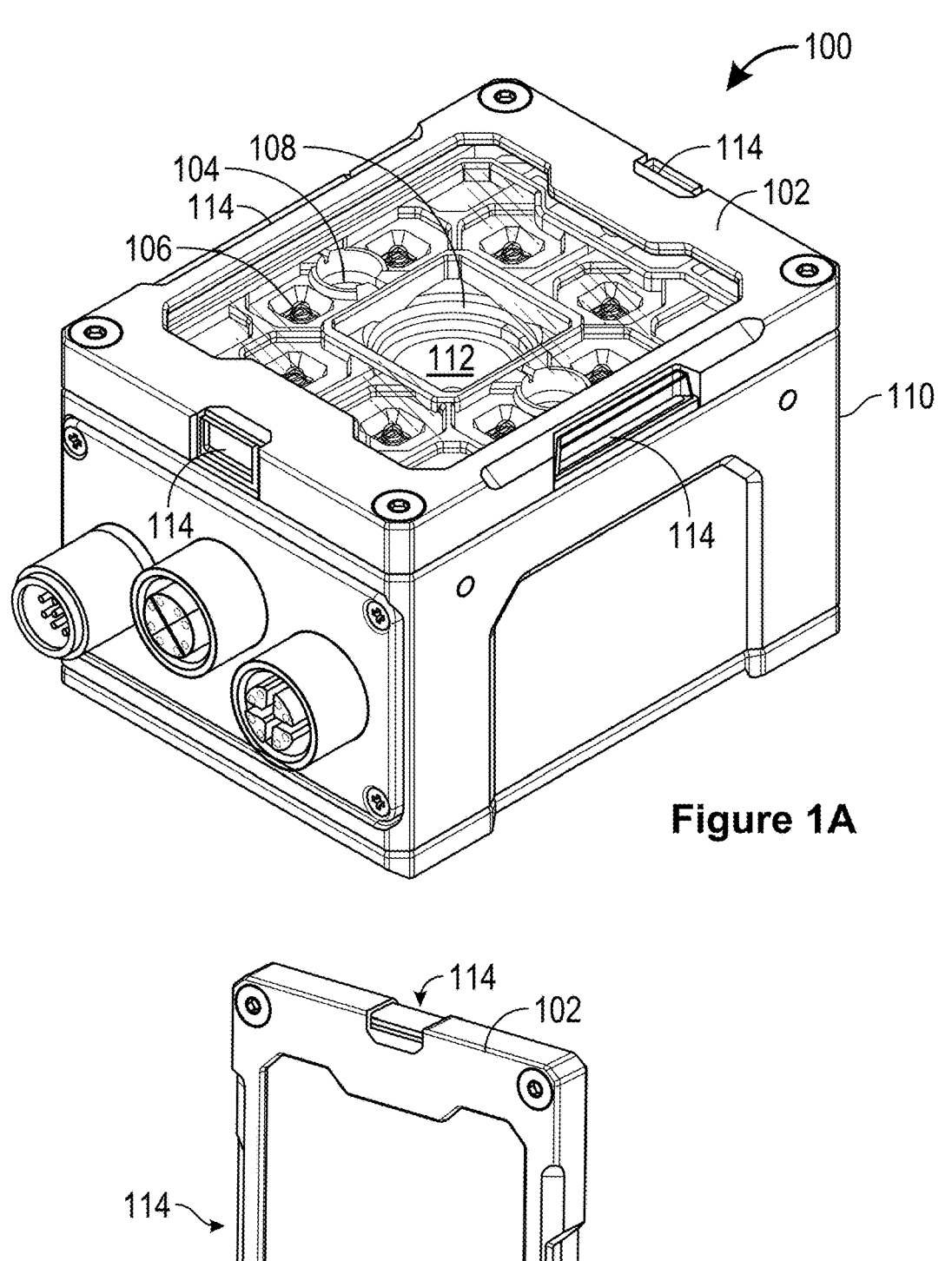
FIG. 1A is a perspective view of an electronic device, in accordance with some embodiments.
FIG. 1B is a perspective view of the top portion of the electronic device in FIG. 1A, in accordance with some embodiments.

FIG. 1A is a perspective view of an electronic device 100 (e.g., a scanning device), in accordance with some embodiments. In some embodiments, the electronic device 100 is also referred to as a code reader, a barcode scanner, a label scanner, an optical scanner, or an image capture system. In some embodiments, the electronic device 100 is part of an optical data reading system (e.g., a label scanning station). The electronic device 100 includes a housing 110 (e.g., a body or an exterior case) for protecting components that are located inside the electronic device 100. In some embodiments, the housing 110 includes integrated fittings or brackets to keep the internal components in place. In some embodiments, the electronic device 100 includes a top cover 102 positioned on the top side of the electronic device 100. In some embodiments, the top cover 102 is transparent or partially transparent.

In some embodiments, the electronic device 100 includes one or more distance sensors 104 (e.g., internal distance sensors), which are positioned within the electronic device 100. For example, referring to FIG. 1A, a distance sensor 104 is positioned inside the electronic device 100 (e.g., adjacent to the top cover 102), and faces the front end of the electronic device 100. In some embodiments, the distance sensor 104 is included in a targeting module. The distance sensor 104 projects a beam of light at a target to aid in visual alignment of the target when the target is disposed on the electronic device 100. This helps align the camera to a center point of an imaging plane or a field of view. In some embodiments, each distance sensor 104 is a time-of-flight (TOF) sensor, an ultrasonic sensor, a radar sensor, a light detection and ranging (LiDAR) sensor, or an infrared (IR) distance sensor. In some embodiments, the electronic device 100 includes two or more distance sensors 104, each having the same type (e.g., each of the two or more distance sensors is a TOF sensor). In some embodiments, the electronic device 100 includes two or more distance sensors, at least two of which are of distinct types (e.g., the electronic device 100 includes a TOF distance sensor and a radar sensor). In some embodiments, the electronic device 100 includes one or more proximity sensors for sensing (e.g., detecting) if an object is within the sensing area where the proximity sensor is designed to operate. In some embodiments, the electronic device 100 uses distance measuring techniques, such as an image focus finder, an analog-to-digital conversion (ADC) circuit, and/or a digital-to-analog conversion (DAC) circuit, to determine the distance between a target object and the electronic device 100.

More specifically, in some embodiments, the distance sensor 104 is a TOF sensor. A TOF sensor measures the elapsed time from the emission of a signal (e.g., a wave pulse, an LED pulse, a laser pulse, or IR waves) from the sensor to the moment it returns to the sensor after reflecting off of an object. Distance is then calculated by using the speed of light in air and the time between sending/receiving the signal. In some embodiments, the distance sensor 104 is an ultrasonic sensor. An ultrasonic sensor, or a Sonar sensor, detects the distance to an object by emitting high-frequency sound waves. The ultrasonic sensor emits high-frequency sound waves towards a target object, and a timer is started. The target object reflects the sound waves back towards the sensor. A receiver picks up the reflected wave and stops the timer. The time taken for the wave's return is calculated against the speed of sound to determine the distance travelled. In some embodiments, the distance sensor 104 is a radar sensor. The radar sensor (e.g., a radar distance sensor) transmits high frequency radio waves (e.g., microwaves) and calculates the distance to an object by measuring the reflection of the radio waves from the object. In some embodiments, the radar sensor is configured to determine the distance, the angle, and the radial velocity of an object relative to the location of the electronic device 100. In some embodiments, the distance sensor 104 is a LiDAR sensor, which measures the range of a target object through light waves from a laser (e.g., instead of radio or sound waves). In some embodiments, the distance sensor 104 is an infrared (IR) distance sensor. An IR distance sensor works through the principle of triangulation, measuring distance based on the angle of the reflected beam.

In some embodiments, the electronic device 100 further includes a plurality of light sources 106 (e.g., 8 light emitting diodes (LEDs) in FIG. 1A) mounted on a printed circuit board (PCB) 108. A light source 106 is also called a lighting source, an illumination source, or an illuminator. In some embodiments, the light sources 106 are part of an illumination system of the electronic device 100, which also includes illuminators (e.g., bright field and dark field illuminators), a reflector, and a lighting module. More details on the illumination system are described in U.S. patent application Ser. No. 14/298,659, filed Jun. 6, 2014, entitled "Combination Dark Field and Bright Field Illuminator," now U.S. Pat. No. 8,989,569, issued on Mar. 24, 2015, which is incorporated by reference herein in its entirety.

In some embodiments, the light sources 106 have one or more lighting types. Examples of the lighting types include, but are not limited to, LED light sources, laser light sources, and liquid crystal display (LCD) lights. Each of the lighting types has respective lighting characteristics, such as color (e.g., blue, red, or green) and/or intensity. The light sources 106 are mounted on (e.g., soldered on) the PCB 108, which is positioned within the electronic device 100 (e.g., behind the top cover 102). The PCB 108 includes a front surface facing the top cover 102 of the electronic device 100. In some embodiments, the light sources mounted on the front surface of the PCB 108 includes both long range light sources and low angle light sources.

In some embodiments, the electronic device 100 includes a camera 112. A lens of the camera 112 is exposed via an opening of the PCB 108 and physically surrounded by the light sources 106. The light sources 106 are grouped into a plurality of illumination units (e.g., a first illumination unit and a second illumination unit). Each illumination unit is configured to be independently controlled to illuminate a distinct region of the field of view of the camera 112. In an example, every two light sources 106 near a corner of the top cover 102 are grouped to form an illumination unit. Four illumination units are independently controlled to illuminate respective regions of a field of view of the camera 112 in a sequential or concurrent manner.

In some embodiments, the electronic device 100 further includes one or more indicators 114. Each indicator 114 is located at an edge of the top cover 102 of the electronic device 100, and configured to be illuminated according to a light pattern in which a single color or different colors are displayed for a sequence of temporal durations defined based on the frequency. In some situations, the light pattern represents a message including data or status of the electronic device 100. For example, the indicators 114 are illuminated with a red color continuously in response to detection of the presence of a product on or near the top cover, and turn to a green color and stay in green for a shortened duration of time in response to a successful scan of a barcode displayed on the product. In some embodiments, each indicator 114 includes one or more LEDs from which light is emitted, and the light is displayed on the indicator 114 in a substantially uniform and homogeneous manner.

FIG. 1B shows just the top cover 102 of the electronic device 100.

Figure 2A:
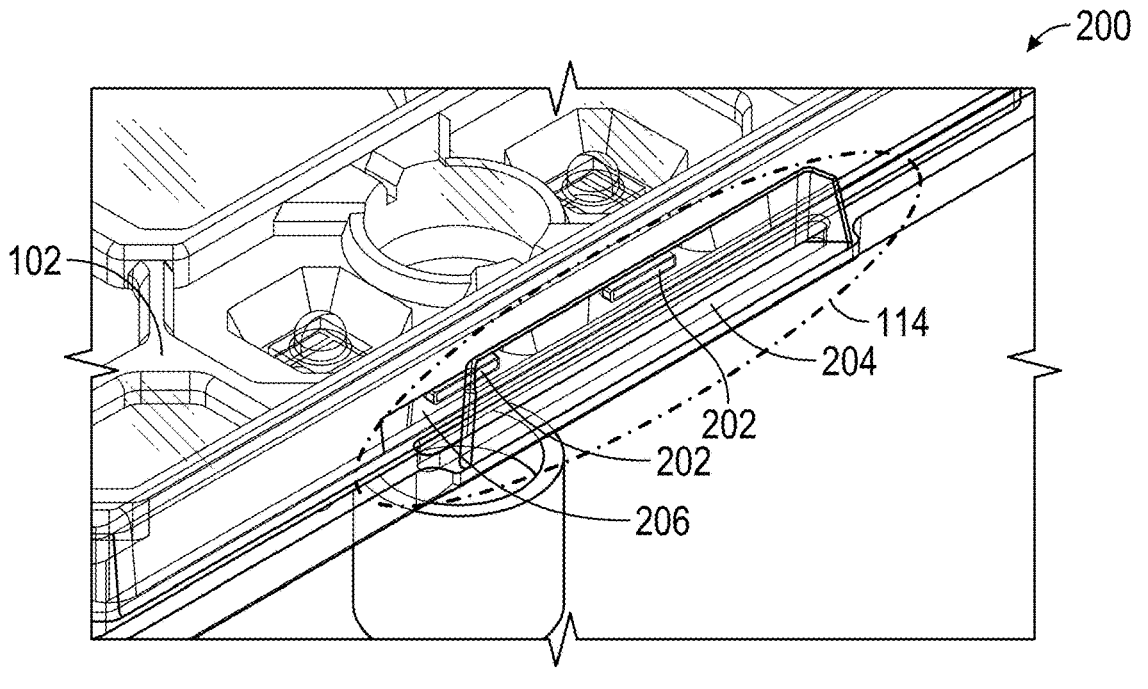
FIG. 2A is a perspective view of an indicator of an electronic device, in accordance with some embodiments.

FIG. 2A is a perspective view 200 of an indicator 114 of an electronic device 100, in accordance with some embodiments. The indicator 114 includes one or more light sources 202 and a light modulator 204. The one or more light sources 202 are disposed inside one or more recesses 206, which are located on, and extend along, a periphery of the top cover 102 of the electronic device 100. The one or more recesses 206 are covered by the light modulator 204 that also extends along the periphery of the top cover 102. In some embodiments, the one or more recesses 206 and the one or more light sources 202 are not visible from the top surface of the top cover 102. When disposed in the recesses 206, each light source 202 is disposed in proximity to the light modulator 204 and faces the light modulator 204. The one or more light sources 202 emit light towards the light modulator 204, and the light modulator 204 diffuses light, thereby forming the indicator 114 that provides substantially uniform and homogenous illumination on the periphery of the top cover 102 of the electronic device 100.

Figure 2B:
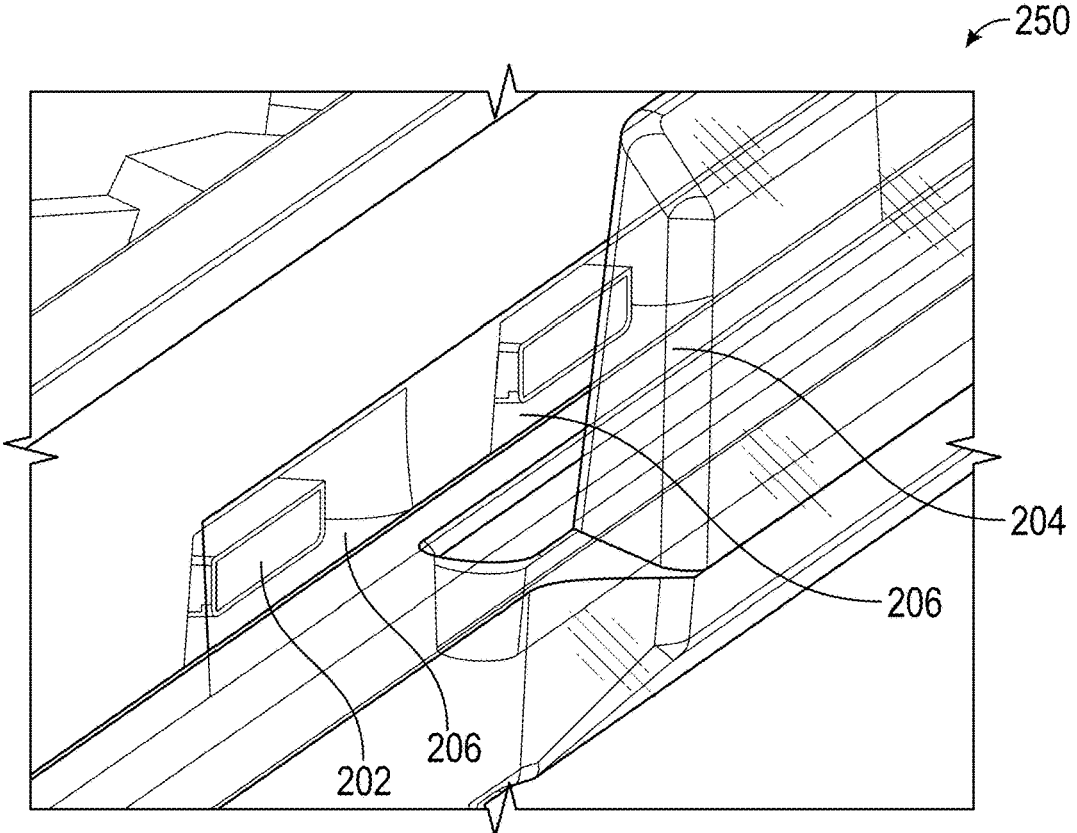
FIG. 2B is an enlarged view focused on a light source of the indicator shown in FIG. 2A, in accordance with some embodiments.

FIG. 2B is an enlarged view 250 focused on a light source 202 of the indicator 114 shown in FIG. 2A, in accordance with some embodiments. The indicator 114 includes a plurality of light sources 202. Each light source 202 is disposed within a separate recess 206, and configured to illuminate towards the light modulator 204. In an example, the light source 202 includes a set of three LEDs corresponding to red, green, and blue, and is configured to provide illumination with a visible light.

Figures 3A, 3B:
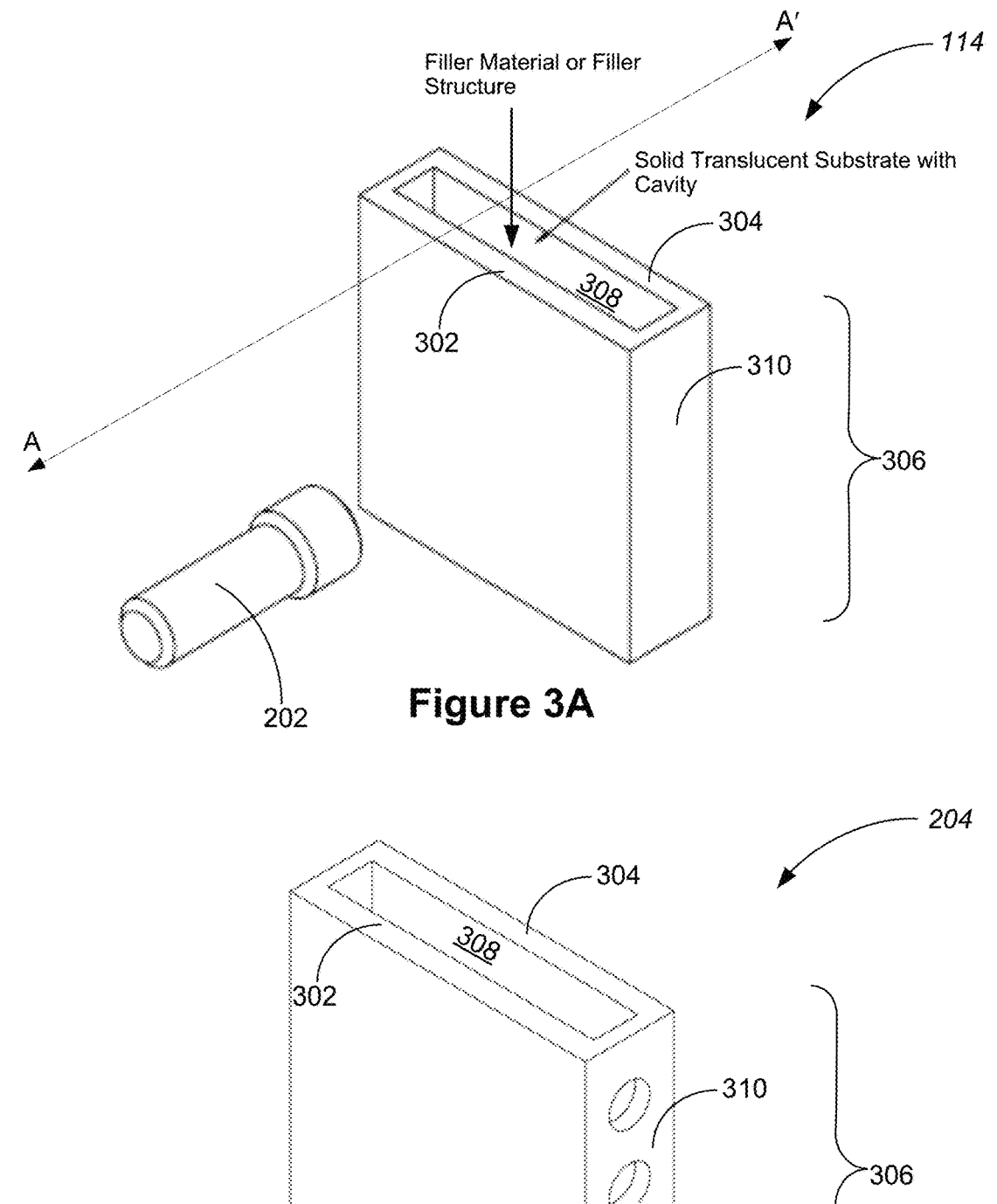
FIG. 3A is a perspective view of an indicator of an electronic device, in accordance with some embodiments.
FIGS. 3B-3D are perspective views of three corresponding light modulators of an indicator of an electronic device having two substantially parallel walls, in accordance with some embodiments.
Figure 3C:
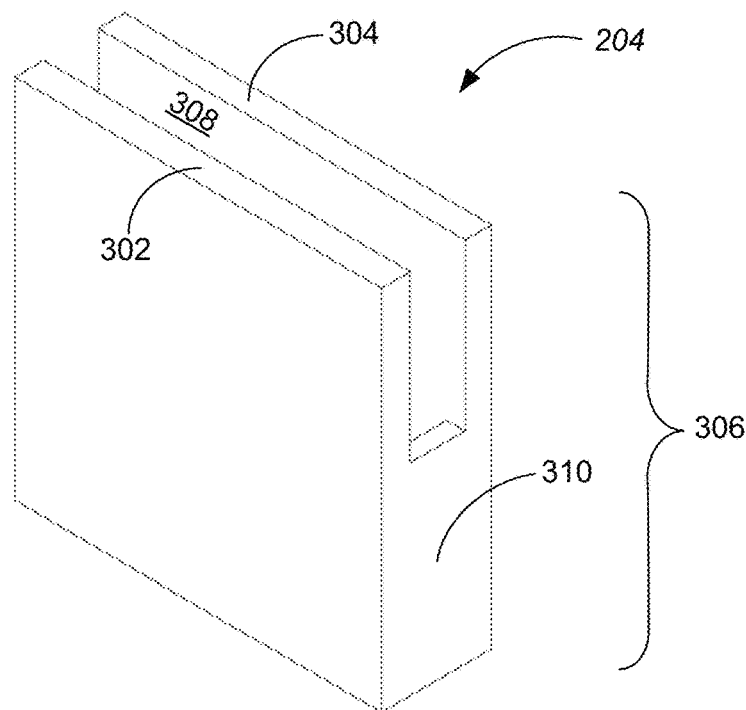
Figure 3D:
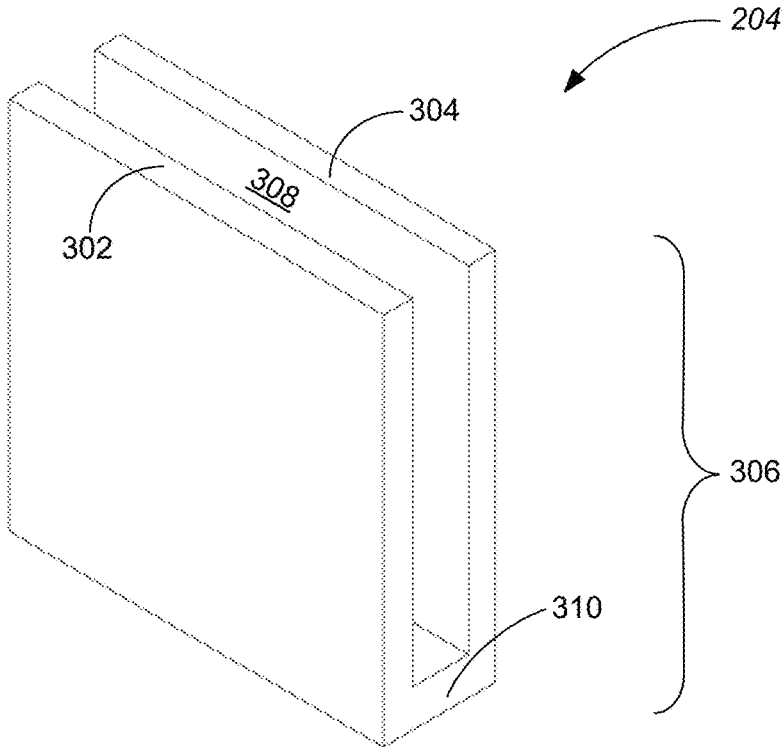

FIG. 3A is a perspective view of an indicator 114 of an electronic device 100, in accordance with some embodiments, and FIGS. 3B-3D are perspective views of three corresponding light modulators 204 of an indicator 114 of an electronic device 100 having two substantially parallel walls 302 and 304, in accordance with some embodiments. The light modulator 204 includes an integral piece of material 306 and a cavity 308. The integral piece of material 306 includes a first wall 302 and a second wall 304 that is separate from the first wall 302. The cavity 308 is located between the first wall 302 and the second wall 304. Referring to FIGS. 3A-3D, in some embodiments, the first wall 302 and the second wall 304 are substantially parallel (e.g., surfaces of the first wall 302 and the second wall 304 form a dihedral angle of less than 5 degrees). The light modulator 204 is configured to diffuse light emitted by a light source 202 that is (i) disposed in proximity to the light modulator 204 and (ii) faces the first wall 302. The light modulator 204 diffuses light by scattering the light at surfaces of the first wall 302, the cavity 308, and the second wall 304, and by diffracting the light within at least the first wall 302 and the second wall 304. In some embodiments, the light is directed towards the first wall 302. The center line of a light beam of the light is parallel with a vector normal to the first wall 302. Alternatively, in some embodiments, the light is configured to enter the light modulator 204 with a non-zero incident angle. The center line of the light beam of the light forms the non-zero incident angle with the normal vector of the first wall 302.

In some embodiments, the integral piece of material 306 is substantially transparent or translucent. In some embodiments, the integral piece of material 306 is opaque (e.g., opaque to visible light, but not for infrared light). In an example, the integral piece of material 306 is a white opaque material, such as a "milky" plastic. In some embodiments, the cavity is at least partially filled with a translucent filler material having a composition that is distinct from the integral piece of material 306. In some embodiments, the light source 202 is an infrared light source. In some embodiments, the light source 202 is a visible light source. In an example, the light source 202 is a color LED. In another example, the light source 202 is a set of three LEDs corresponding to red, green, and blue.

In some embodiments, the integral piece of material 306 further includes an edge structure 310 extending from one or more edges of the first wall 302 to one or more corresponding edges of the second wall 304. Referring to FIG. 3A, the edge structure 310 extends from three edges of the first wall 302 to three corresponding edges of the second wall 304, leaving a remaining edge of each of the first wall 302 and the second wall 304 unconnected and allowing an access to the cavity 308 (e.g., during a molding process). In some embodiments, the edge structure 310 extends from a portion of a first edge of the first wall 302 to a portion of a corresponding second edge of the second wall 304. The edge structure 310 does not cover the entire edge of the first edge of the first wall 302. For example, referring to FIG. 3B, the edge structure 310 has a plurality of holes 312. In another example, referring to FIG. 3C, the edge structure 310 extends from the bottom half of the first edge of the first wall 302 to the bottom half of the second edge of the second wall 304. In another example not shown, the edge structure 310 extends from a central portion (e.g., ⅓) of the first edge of the first wall 302 to a central portion (e.g., ⅓) of the second edge of the second wall 304. In some embodiments, referring to FIG. 3D, the edge structure 310 extends from only one edge or only a portion of one edge of the first wall 302 to a corresponding edge or portion of one edge of the second wall 304.

Figure 3E:
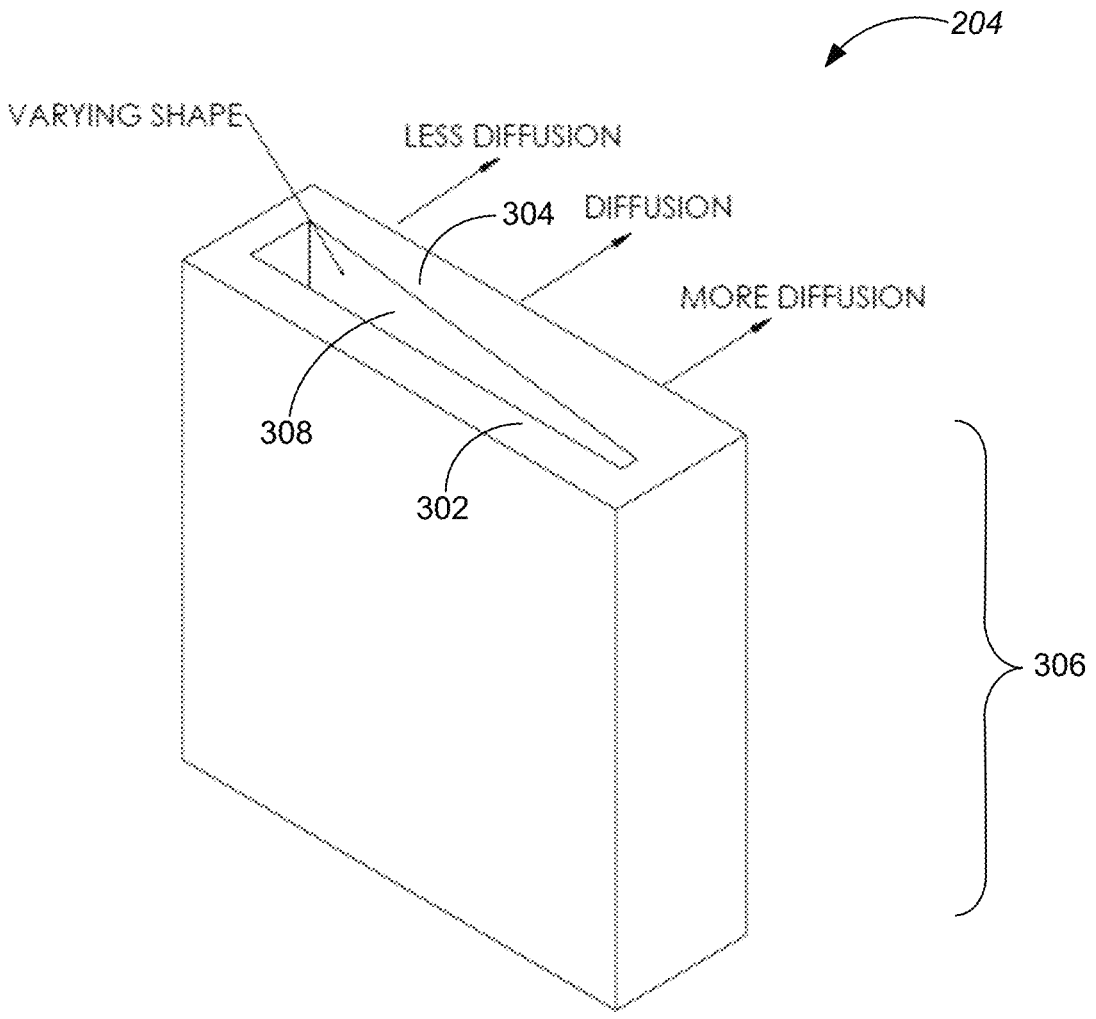
FIG. 3E is a perspective view of a light modulator of an indicator in which a wall has a varying thickness, in accordance with some embodiments.

FIG. 3E is a perspective view of a light modulator 204 of an indicator 114 in which a wall (e.g., the second wall 304) has varying thickness, in accordance with some embodiments. The light modulator 204 includes an integral piece of material 306 and a cavity 308. The integral piece of material 306 includes a first wall 302 and a second wall 304 that is separate from the first wall 302. The cavity 308 is located between the first wall 302 and the second wall 304. The light modulator 204 is configured to diffuse light emitted by a light source 202 that is (i) disposed in proximity to the light modulator 204 and (ii) faces the first wall 302. The light modulator 204 diffuses light by scattering the light at the surfaces of the first wall 302, the cavity 308, and the second wall 304, and diffracting the light within at least the first wall 302 and the second wall 304. At least one of the first wall 302 and the second wall 304 has a thickness that varies according to the location of the incident light.

Specifically, in this example, the first wall 302 has a fixed first thickness, and the second wall 304 has a varying thickness. The first internal surface of the first wall 302 faces, and is extended to have a varying distance from, the second internal surface of the second wall 304. The first external surface of the first wall 302 and the second external surface of the second wall 304 are substantially parallel to one another. The cavity 308 has a varying thickness along the length of the cavity 308, thereby controlling the magnitude of diffusion along the length.

Figure 4:
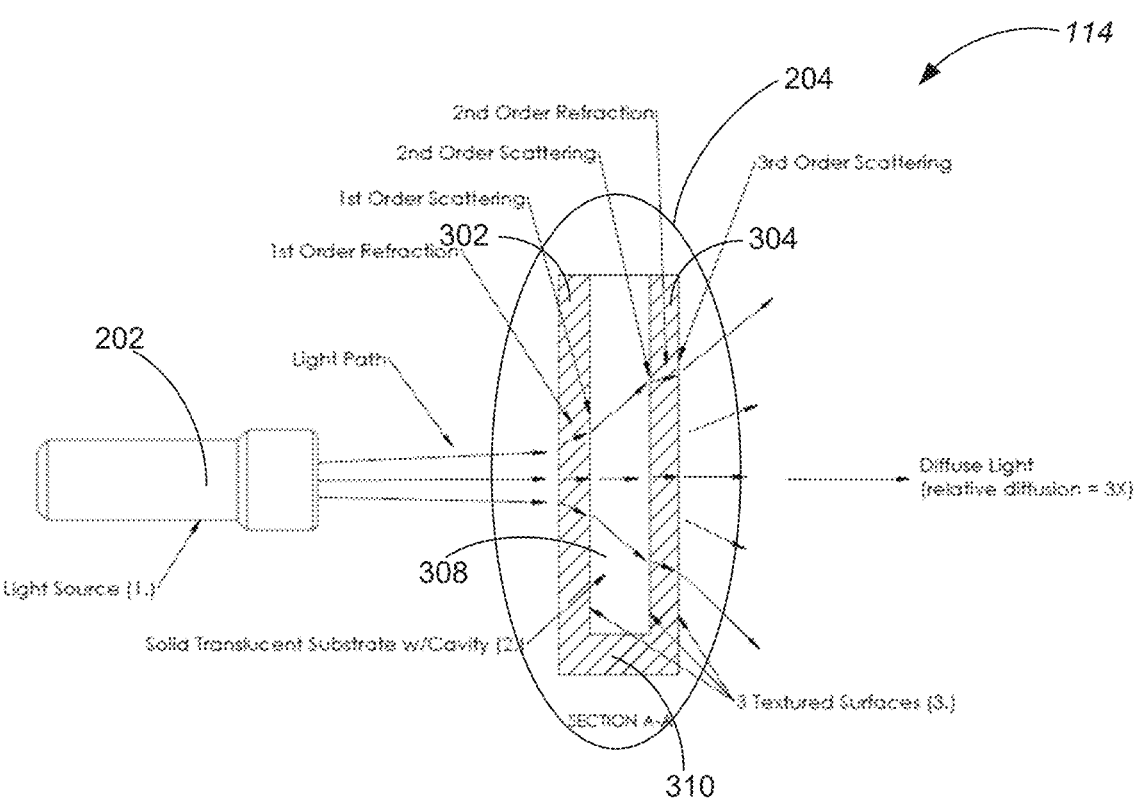
FIG. 4 is a side view of another indicator of an electronic device for diffusing light, in accordance with some embodiments.

FIG. 4 is a side view of another example indicator 114 of an electronic device 100 for diffusing light, in accordance with some embodiments. The side view is captured at a cross section passing a line A-A' and perpendicular to external surfaces of the first wall 302 and a second wall of a light modulator 204 in FIG. 3A. The light indicator 114 includes the light source 202 and the light modulator 204. The light modulator 204 further includes an integral piece of material 306 and a cavity 308. The integral piece of material 306 includes the first wall 302 and the second wall 304. The second wall 304 is separate from the first wall 302 and coupled to the first wall 302 via an edge structure 310. The cavity 308 is located between the first wall 302 and the second wall 304. The bottom edge of the first wall 302 extends to the bottom edge of the second wall 304 via the edge structure 310, which is also part of the integral piece of material 306. The light source 202 is disposed in proximity to the light modulator 204 and faces the first wall 302 of the light modulator 204.

The light modulator 204 is configured to diffuse light by scattering the light at surfaces of the first wall 302, the cavity 308, and the second wall 304, and diffracting the light within at least the first wall 302 and the second wall 304. In some embodiments, the light is directly illuminated on the first wall 302. The center line of a light beam of the light is parallel with a normal vector to the first wall 302. In some situations, the light emitted by the light source 202 has a first order refraction in the first wall 302, a first order scattering at an interface between the first wall 302 and the cavity 308, a second order scattering at an interface between the cavity 308 and the second wall 304, a second order refraction in the second wall 304, and a third order scattering at an interface between the second wall 304 and the ambient environment.

Further, in some embodiments, the cavity 308 is at least partially filled with a translucent filler material having a composition that is distinct from the integral piece of material 306, thereby adding an additional diffraction effect to the light modulator 204. Given multiple scattering surfaces and diffraction material layers, the light modulator 204 can enhance light diffusion effects (e.g., by three times) and result in uniform and homogenous illumination by the light source 202.

In some embodiments not shown, the first wall 302 and the second wall 304 are connected by a structure distinct from the edge structure 310. The integral piece of material 306 further includes a plurality of pillar structures connecting the first surface of the first wall 302 to the second surface of the second wall 304. The first surface of the first wall 302 faces the second surface of the second wall 304. The pillar structures are located away from outermost edges of the first wall 302 and the second wall 304.

Figure 5:
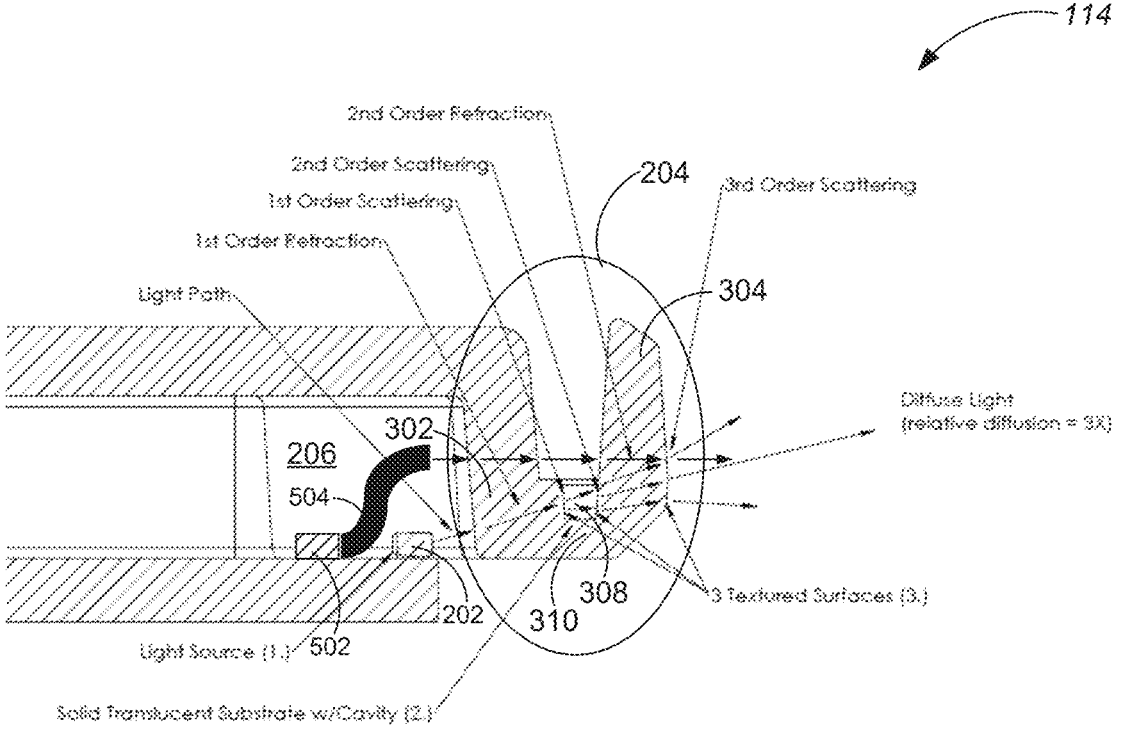
FIG. 5 is a side view of an example indicator of an electronic device for diffusing light having an incident angle, in accordance with some embodiments.

FIG. 5 is a side view of an example indicator 114 of an electronic device 100 for diffusing light having an incident angle, in accordance with some embodiments. The side view is captured at a cross section passing a line A-A' and perpendicular to the top surface of the top cover 102 of the electronic device 100 in FIGS. 1 and 2A. The indicator 114 includes a light source 202 and a light modulator 204. The light source 202 is disposed inside a recess 206 of the top cover 102. The recess 206 is located on the periphery of the top cover 102 of the electronic device 100. The light modulator 204 forms the top surface of the top cover 102, and wraps around an edge of the top cover to form the periphery of the top cover 102. In some embodiments, the recess 206 and the light source 202 are not visible from the top surface of the top cover 102. When disposed in the recess 206, the light source 202 is disposed in proximity to the light modulator 204 and faces the light modulator 204. The light source 202 emits light towards the light modulator 204, and the light modulator 204 diffuses light, thereby forming the indicator 114 that provides substantially uniform and homogenous illumination along the periphery of the top cover 102 of the electronic device 100.

Referring to FIG. 5, in some embodiments, both the first wall 302 and the second wall 304 do not have uniform thicknesses. The first wall 302 has a stair-like structure, and the second wall has a varying thickness along its height. The bottom edge of the first wall 302 extends and is connected to the bottom edge of the second wall 304 via an edge structure 310, which is also part of the integral piece of material 306. In some embodiments, the light emitted by the light source 202 is configured to enter the light modulator 204 with a non-zero incident angle (e.g., 20 degrees in FIG. 5). The center line of the light beam of the light is tilted up to form the non-zero incident angle with respect to a normal vector to the first wall 302 or a flat bottom surface of the edge structure 310. In some situations, the light emitted by the light source 202 has a first order refraction in the first wall 302, a first order scattering at an interface between the first wall 302 and the cavity 308, a second order scattering at an interface between the cavity 308 and the second wall 304, a second order refraction in the second wall 304, and a third order scattering at an interface between the second wall 304 and an ambient environment. Further, in some embodiments, the cavity 308 is at least partially filled with a translucent filler material having a composition that is distinct from the integral piece of material 306, thereby adding an additional diffraction effect to the light modulator 20) 4. In some embodiments, some of the surfaces of the first wall 302 and the second wall 304 are textured. In some embodiments, some of the surfaces of the first wall 302 and the second wall 304 have a matte finish corresponding to a smooth, even surface free from shine or highlights.

In some embodiments, the light source 202 further includes a first light source 502 (e.g., an LED) and a light pipe 504 coupled to the LED 506. An outlet of the light pipe 504 faces the first wall 302. The light pipe 504 is configured to receive the light emitted by the first light source 502 at an inlet and guide the light through a length of the light pipe 504, and emit the light from the outlet.

Figure 6A:
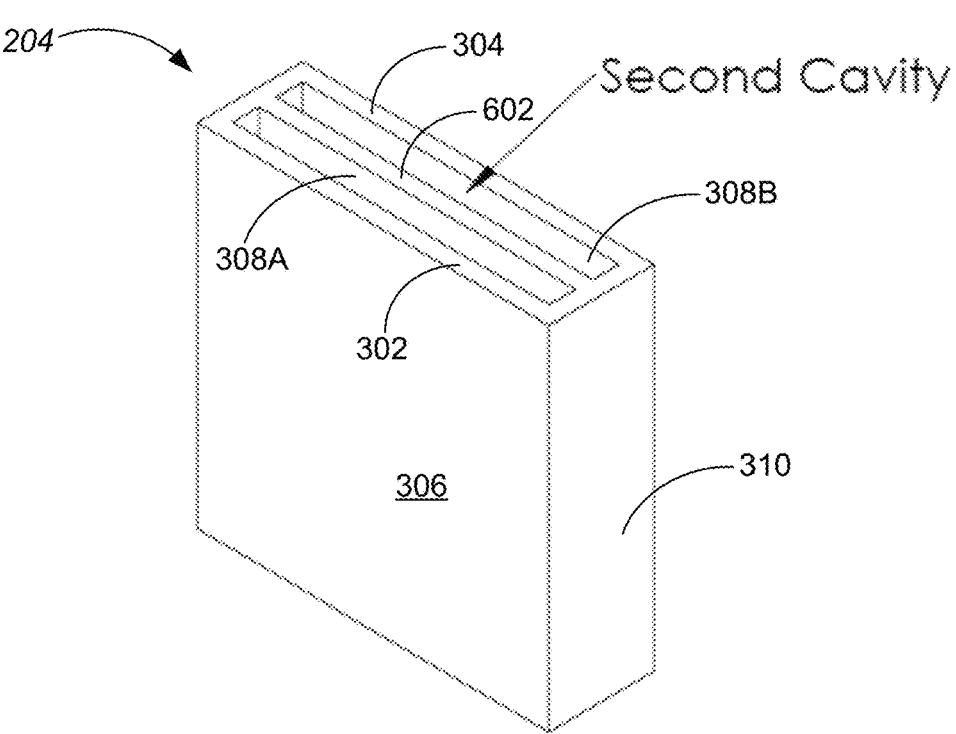
FIGS. 6A and 6B are perspective views of a light modulator of an indicator having an internal wall and two cavities, in accordance with some embodiments.
Figure 6B:
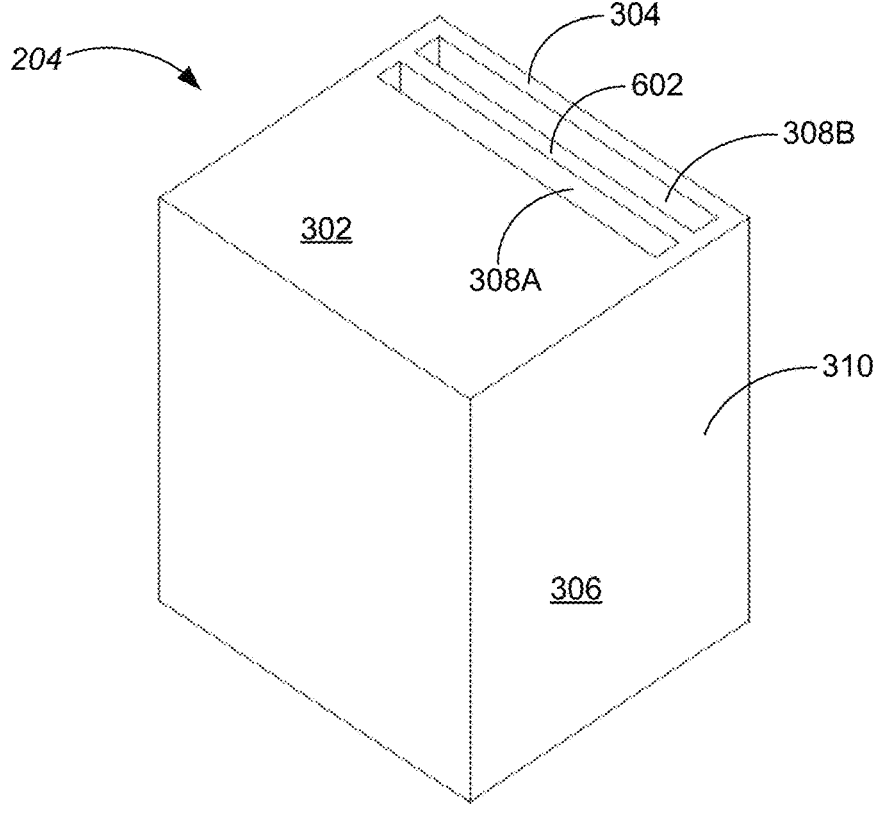

FIGS. 6A and 6B are perspective views of a light modulator 204 of an indicator 114 having an internal wall 602 and two cavities 308A and 308B, in accordance with some embodiments. The light modulator 204 includes an integral piece of material 306. The integral piece of material 306 includes a first wall 302, a second wall 304, and one or more internal walls 602. In some embodiments, an internal wall 602 is substantially parallel to the first wall and parallel to the second wall. A first cavity portion 308A is located between the first wall 302 and the internal wall 602, and a second cavity portion 308B is located between the second wall 304 and the internal wall 602. In some embodiments, the first wall 302 and the second wall 304 are substantially parallel. Referring to FIG. 6A, in some embodiments, the first wall 302 and the second wall 304 have the same thickness. Referring to FIG. 6B, in some embodiments, the first wall 302 and the second wall 304 have different thicknesses. The light modulator 204 is configured to diffuse light emitted by a light source 202 that is (i) disposed in proximity to the light modulator 204 and (ii) faces the first wall 302. The light modulator 204 diffuses light by scattering the light at surfaces of the first wall 302, the internal walls 602, and the second wall 304 and diffracting the light within at least the first wall 302, the second wall 304, and the internal walls 602. Some embodiments include an edge structure 310.

In some embodiments not shown, the light modulator 204 has a plurality of parallel internal walls 602. Each internal wall 602 has a respective thickness. The plurality of parallel internal walls 602 may all have the same thickness or have different thicknesses. In some embodiments, each of a subset of internal walls 602 has a varying thickness.

Figure 7:
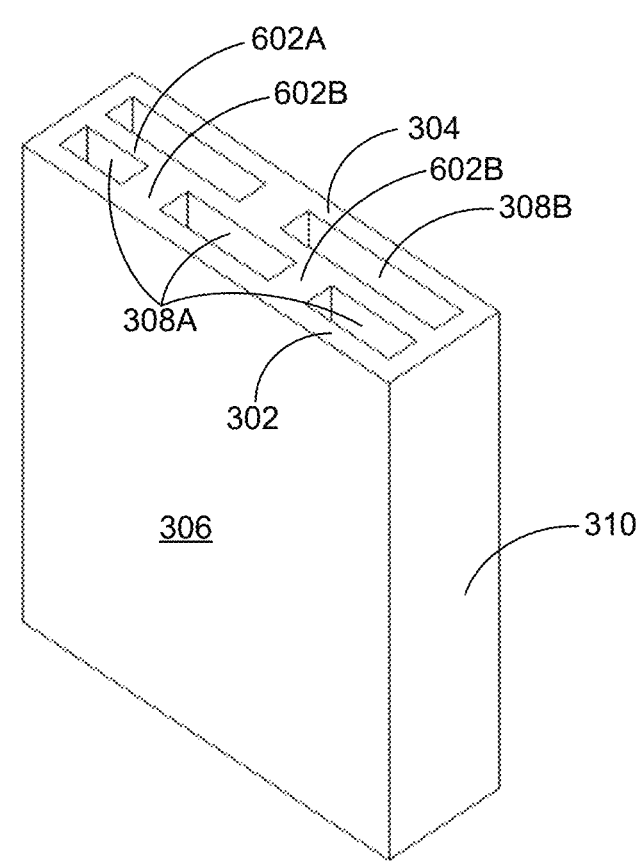
FIG. 7 is a perspective view of a light modulator of an indicator having an internal structure including a plurality of cavities, in accordance with some embodiments.

FIG. 7 is a perspective view of a light modulator 204 of an indicator 114 having an internal structure including a plurality of cavities, in accordance with some embodiments. The light modulator 204 includes an integral piece of material 306. The integral piece of material 306 includes a first wall 302, a second wall 304, and one or more internal walls 602A and 602B. In some embodiments, each of a first subset of the internal walls 602A is substantially parallel to the first wall 302 and to the second wall 304. In some embodiments, each of a second subset of the internal walls 602B is substantially perpendicular to the first wall 302 and to the second wall 304. The one or more internal walls 602A and 602B form an internal structure and divides a cavity into a plurality of smaller cavities (also called cavity portions) 308A and 308B, providing additional scattering surfaces and diffracting material layers.

Figure 8:
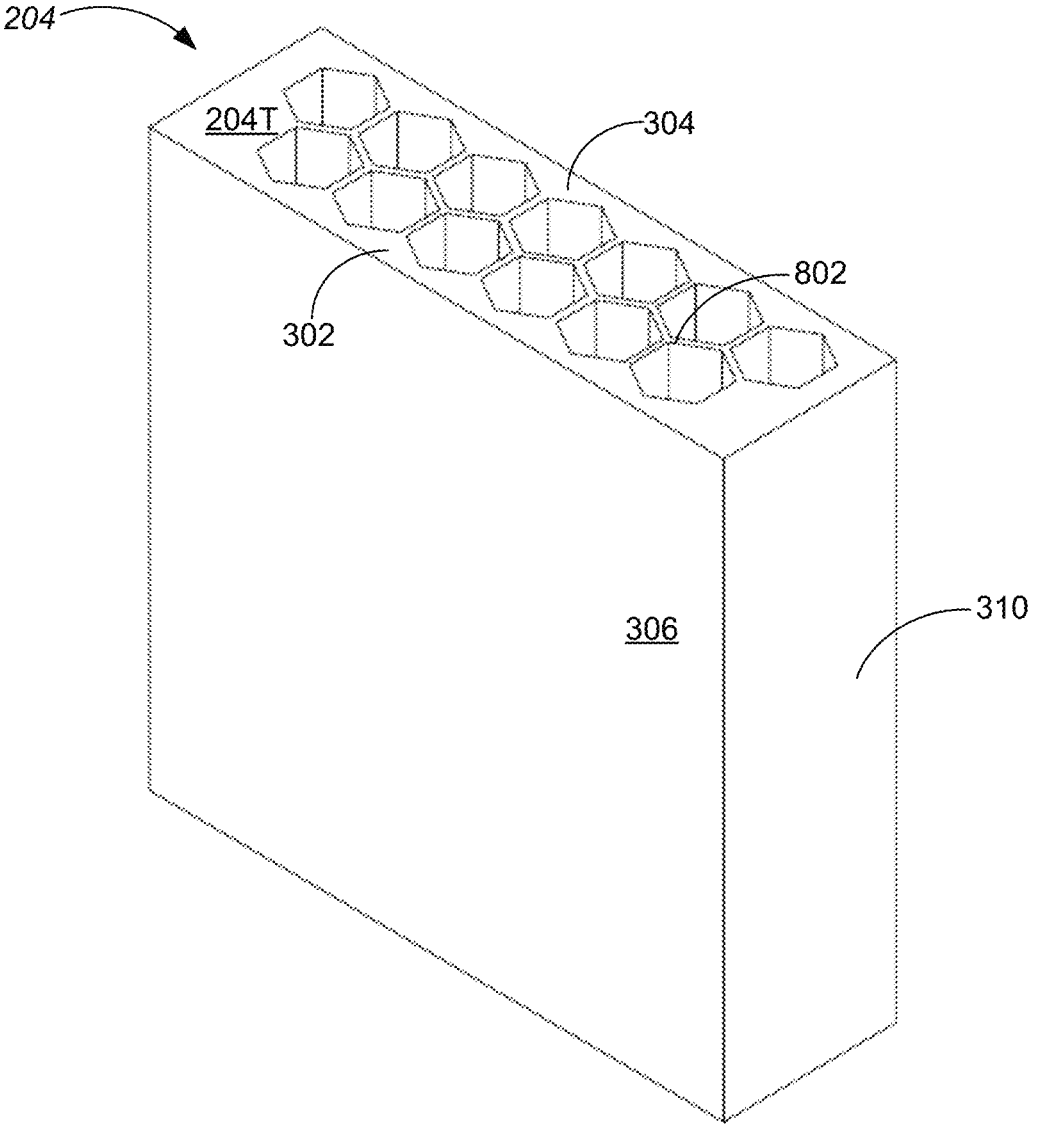
FIG. 8 is a perspective view of a light modulator of an indicator having an example internal honeycomb structure, in accordance with some embodiments.

In some embodiments, a plurality of distinct cavity portions includes one or more first cavity portions 308A between first two neighboring walls of the first wall 302, the second wall 304, and the internal walls 602, and one or more second cavity portions 308B between second two neighboring walls of the first wall 302, the second wall 304, and the internal walls 602. In some embodiments, the first cavity portions 308A have a first filler structure connecting the first two neighboring walls, and the second cavity portions 308B have a second filler structure connecting the second two neighboring walls. The second filler structure is distinct from the first filler structure. Alternatively, in some embodiments, the first cavity portions 308A have a first filler structure (e.g., the internal walls 602B) connecting the first two neighboring walls, and the second cavity portions 308B is filled with air and no other filler structure or material. For example, the first cavity portions 308A are formed between the first wall 302 and the internal wall 602A, and a corresponding internal filler structure includes two internal walls 602B perpendicular to the internal wall 602A. The second cavity portion 308B is formed between the second wall 304 and the internal wall 602A. The second cavity portion 308B does not includes any filler structure. In some embodiments, the second cavity portions 308B include a first filler material (e.g., a transparent epoxy material). In another example, the second cavity portion 308B includes a honeycomb structure 802 as shown in FIG. 8. In some embodiments, the first filler structure filling the first cavity portions 308A include a honeycomb structure, and cross sections of the honeycomb structure perpendicular to the first wall remain identical independently of position of the cross sections at a height of the first wall 302.

In some embodiments, the integral piece of material 306 further includes a plurality of pillar structures connecting any two neighboring walls of the first wall 302, the second wall 304, and the one or more internal walls 602A and 602B to one another, and the plurality of pillar structures is not located on edges of the two neighboring walls.

Some embodiments include an edge structure 310, and described above for FIGS. 3A-3E.

In some embodiments, the integral piece of material 306 includes a first portion and a second portion, and the first portion and the second portion are coupled to each other via an adhesive to form at least part of the integral piece of material.

FIG. 8 is a perspective view of a light modulator 204 of an indicator 114 having an example internal honeycomb structure 802, in accordance with some embodiments. The honeycomb structure 802 connects a first surface of the first wall 302 to a second surface of the second wall 304. Cross sections of the honeycomb structure 802 include a plurality of hexagon shapes that are substantially parallel to the top surface 204T of the light modulator 204 and remain identical independent of position of the cross section at a height of the first wall 302. Each hexagon shape surrounds a light channel that extends in parallel with the first wall 302.

In some embodiments, the light modulator 204 includes an integral piece of material 306 having a first wall 302, a second wall 304, and a cavity 308 between the first wall 302 and the second wall 304. The cavity 308 is filled with a filler structure including a honey comb structure 802 or 802. The first surface of the first wall 302 and the second surface of the second wall 304 are modified by the honeycomb structure 802.

It is noted that the honeycomb structure 802 is merely an example of filler structures. Other filler structures may be applied to fill a cavity 308 or a portion of a cavity 308 between the first wall 302 and the second wall 304 of the integral piece of material 306. For example, in some embodiments not shown, the honeycomb structure 802 connects a first surface of the first wall 302 to a second surface of the second wall 304. Cross sections of the honeycomb structure 802 include a plurality of hexagon shapes that are parallel to the first surface of the first wall 302 and remain identical independent of distance between the cross section and the first surface of first wall 302. Each hexagon shape surrounds a light channel connecting the first surface of the first wall 302 to the second surface of the second wall 304.

Implementation examples are described in at least the following numbered clauses:

Clause 1. A light modulator, comprising: an integral piece of material including a first wall and a second wall that is separate from the first wall; and a cavity located between the first wall and the second wall: wherein the light modulator is configured to diffuse light emitted by a light source that is (i) disposed in proximity to the light modulator and (ii) faces the first wall, by scattering the light at surfaces of the first wall, the cavity, and the second wall, and diffracting the light within at least the first wall and the second wall.

Clause 2. The light modulator of clause 1, wherein the integral piece of material is substantially transparent or translucent.

Clause 3. The light modulator of clause 1 or 2, wherein the cavity is at least partially filled with a translucent filler material having a composition that is distinct from the integral piece of material.

Clause 4. The light modulator of any of clauses 1-3, wherein the integral piece of material further comprises a plurality of pillar structures connecting a first surface of the first wall to a second surface of the second wall, the plurality of pillar structures located away from outermost edges of the first wall and the second wall.

Clause 5. The light modulator of any of clauses 1-4, wherein the integral piece of material further comprises a honeycomb structure connecting a first surface of the first wall to a second surface of the second wall, and cross sections of the honeycomb structure perpendicular to the first wall remain identical independently of positions of the cross sections at heights along the first wall.

Clause 6. The light modulator of any of clauses 1-5, wherein the first wall and the second wall have different thicknesses.

Clause 7. The light modulator of any of clauses 1-6, wherein the light source is fixed in a portion of an electronic device, and the light modulator is fixed in a portion of the electronic device adjacent to the light source.

Clause 8. The light modulator of any of clauses 1-7, wherein the integral piece of material includes a first portion and a second portion, and the first portion and the second portion are coupled to each other via an adhesive to form at least part of the integral piece of material.

Clause 9. The light modulator of any of clauses 1-8, wherein the integral piece of material further comprises an edge structure extending from one or more edges of the first wall to one or more corresponding edges of the second wall.

Clause 10. The light modulator of clause 9, wherein the edge structure extends from three edges of the first wall to three corresponding edges of the second wall, leaving a remaining edge of each of the first wall and the second wall unconnected and allowing access to the cavity.

Clause 11. The light modulator of clause 9 or 10, wherein the edge structure extends from a portion of a first edge of the first wall to a portion of a corresponding second edge of the second wall.

Clause 12. The light modulator of any of clauses 1-11, wherein at least one of the first wall and the second wall has a thickness that varies according to location.

Clause 13. The light modulator of any of clauses 1-11, wherein the first wall and the second wall have the same thickness.

Clause 14. The light modulator of any of clauses 1-13, wherein the integral piece of material further comprises one or more internal walls, and each internal wall is substantially parallel to the first wall and parallel to the second wall.

Clause 15. The light modulator of clause 14, wherein the cavity is divided into a plurality of distinct cavity portions by the one or more internal walls.

Clause 16. The light modulator of clause 15, wherein the plurality of distinct cavity portions includes a first cavity portion between first two neighboring walls of the first wall, the second wall, and the internal walls and a second cavity portion between second two neighboring walls of the first wall, the second wall, and the internal walls.

Clause 17. The light modulator of clause 16, wherein (i) the first cavity portion has a first filler structure connecting the first two neighboring walls, (ii) the second cavity portion has a second filler structure connecting the second two neighboring walls, and (iii) the second filler structure is distinct from the first filler structure.

Clause 18. The light modulator of clause 16, wherein the first cavity portion has a first filler structure connecting the first two neighboring walls, and the second cavity portion is filled with air and no other filler structure or material.

Clause 19. The light modulator of clause 17 or clause 18, wherein the first filler structure includes a honeycomb structure, cross sections of the honeycomb structure that are perpendicular to the first wall remain identical independently of distance between the cross sections and one of the first two neighboring walls.

Clause 20. The light modulator of clause 14, wherein the integral piece of material further includes a plurality of pillar structures connecting two neighboring walls of the first wall, the second wall, and the one or more internal walls to one another, and the plurality of pillar structures is not located on edges of the two neighboring walls.

Clause 21. The light modulator of any of clauses 1-20, wherein: the light source further includes a first light source and a light pipe coupled to the first light source: an outlet of the light pipe faces the first wall; and the light pipe is configured to receive the light emitted by the first light source at an inlet and guide the light through a length of the light pipe, and emit the light from the outlet.

Clause 22. A light module, comprising: the light modulator of any of clauses 1-21; and a light source disposed in proximity to the light modulator.

Clause 23. An electronic device, comprising: the light modulator of any of clauses 1-21.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises." and/or "comprising." when used in this specification, specify the presence of stated features, steps, operations, elements, and/or components, but do not preclude the presence or addition of one or more other features, steps, operations, elements, components, and/or groups thereof. Additionally, it will be understood that, although the terms "first" and "second" may be used herein to describe various elements, these elements should not be limited by these terms. These terms are only used to distinguish one element from another.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or embodiments.

As used herein, the term "and/or" encompasses any combination of listed elements. For example, "A, B, and/or C" includes the following options: A only, B only, C only, A and B without C, A and C without B, B and C without A, and a combination of all three elements, A, B, and C.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A light modulator, comprising:
an integral piece of material including a first wall and a second wall that is separate from the first wall, wherein the integral piece of material further comprises a honeycomb structure connecting a first surface of the first wall to a second surface of the second wall, and cross sections of the honeycomb structure perpendicular to the first wall remain identical independently of positions of the cross sections at heights along the first wall; and
a cavity located between the first wall and the second wall;
wherein the light modulator is configured to diffuse light emitted by a light source that is (i) disposed in proximity to the light modulator and (ii) faces the first wall, by scattering the light at surfaces of the first wall, the cavity, and the second wall, and diffracting the light within at least the first wall and the second wall.

2. The light modulator of claim 1, wherein the integral piece of material is substantially transparent or translucent.

3. The light modulator of claim 1, wherein the cavity is at least partially filled with a translucent filler material having a composition that is distinct from the integral piece of material.

4. The light modulator of claim 1, wherein the integral piece of material further comprises a plurality of pillar structures connecting a first surface of the first wall to a second surface of the second wall, the plurality of pillar structures located away from outermost edges of the first wall and the second wall.

5. The light modulator of claim 1, wherein the first wall and the second wall have different thicknesses.

6. The light modulator of claim 1, wherein the light source is fixed in a portion of an electronic device, and the light modulator is fixed in a portion of the electronic device adjacent to the light source.

7. The light modulator of claim 1, wherein the integral piece of material includes a first portion and a second portion, and the first portion and the second portion are coupled to each other via an adhesive to form at least part of the integral piece of material.

8. The light modulator of claim 1, wherein the integral piece of material further comprises an edge structure extending from one or more edges of the first wall to one or more corresponding edges of the second wall.

9. The light modulator of claim 8, wherein the edge structure extends from three edges of the first wall to three corresponding edges of the second wall, leaving a remaining edge of each of the first wall and the second wall unconnected and allowing access to the cavity.

10. The light modulator of claim 8, wherein the edge structure extends from a portion of a first edge of the first wall to a portion of a corresponding second edge of the second wall.

11. The light modulator of claim 1, wherein at least one of the first wall and the second wall has a thickness that varies according to location.

12. The light modulator of claim 1, wherein the first wall and the second wall have the same thickness.

13. The light modulator of claim 1, wherein the integral piece of material further comprises one or more internal walls, and each internal wall is substantially parallel to the first wall and parallel to the second wall.

14. The light modulator of claim 13, wherein the cavity is divided into a plurality of distinct cavity portions by the one or more internal walls.

15. The light modulator of claim 14, wherein the plurality of distinct cavity portions includes a first cavity portion between first two neighboring walls of the first wall, the second wall, and the internal walls and a second cavity portion between second two neighboring walls of the first wall, the second wall, and the internal walls.

16. The light modulator of claim 15, wherein (i) the first cavity portion has a first filler structure connecting the first two neighboring walls, (ii) the second cavity portion has a second filler structure connecting the second two neighboring walls, and (iii) the second filler structure is distinct from the first filler structure.

17. The light modulator of claim 15, wherein the first cavity portion has a first filler structure connecting the first two neighboring walls, and the second cavity portion is filled with air and no other filler structure or material.

18. The light modulator of claim 13, wherein the integral piece of material further includes a plurality of pillar structures connecting two neighboring walls of the first wall, the second wall, and the one or more internal walls to one another, and the plurality of pillar structures is not located on edges of the two neighboring walls.

19. The light modulator of claim 1, wherein:
the light source further includes a first light source and a light pipe coupled to the first light source;
an outlet of the light pipe faces the first wall; and
the light pipe is configured to receive the light emitted by the first light source at an inlet and guide the light through a length of the light pipe, and emit the light from the outlet.

20. A light modulator, comprising:
an integral piece of material including a first wall and a second wall that is separate from the first wall; and a cavity located between the first wall and the second wall, wherein the integral piece of material further comprises an edge structure extending from three edges of the first wall to three corresponding edges of the second wall, leaving a remaining edge of each of the first wall and the second wall unconnected and allowing access to the cavity;

wherein the light modulator is configured to diffuse light emitted by a light source that is (i) disposed in proximity to the light modulator and (ii) faces the first wall, by scattering the light at surfaces of the first wall, the cavity, and the second wall, and diffracting the light within at least the first wall and the second wall.

21. A light modulator, comprising:

an integral piece of material including a first wall and a second wall that is separate from the first wall, wherein the integral piece of material further includes one or more internal walls, and each internal wall is substantially parallel to the first wall and parallel to the second wall; and a cavity located between the first wall and the second wall, wherein:

the cavity is divided into a plurality of distinct cavity portions by the one or more internal walls; and the plurality of distinct cavity portions includes a first cavity portion between first two neighboring walls of the first wall, the second wall, and the internal walls and a second cavity portion between second two neighboring walls of the first wall, the second wall, and the internal walls;

wherein the light modulator is configured to diffuse light emitted by a light source that is (i) disposed in proximity to the light modulator and (ii) faces the first wall, by scattering the light at surfaces of the first wall, the cavity, and the second wall, and diffracting the light within at least the first wall and the second wall.

\* \* \* \* \*